US012370856B2

(12) United States Patent
Izawa et al.

(10) Patent No.: US 12,370,856 B2
(45) Date of Patent: Jul. 29, 2025

(54) STATE QUANTITY ESTIMATION DEVICE, CONTROL DEVICE, AND STATE QUANTITY ESTIMATION METHOD

(71) Applicant: HITACHI ASTEMO, LTD., Ibaraki (JP)

(72) Inventors: Masaki Izawa, Ibaraki (JP); Shubham Gupta, Ibaraki (JP)

(73) Assignee: HITACHI ASTEMO, LTD., Ibaraki (JP)

(*) Notice: Subject to any disclaimer, the term of this patent is extended or adjusted under 35 U.S.C. 154(b) by 699 days.

(21) Appl. No.: 17/200,456

(22) Filed: Mar. 12, 2021

(65) Prior Publication Data

US 2021/0201034 A1 Jul. 1, 2021

Related U.S. Application Data

(63) Continuation of application No. PCT/JP2019/020084, filed on May 21, 2019.

(30) Foreign Application Priority Data

Oct. 18, 2018 (JP) .................. 2018-197025

(51) Int. Cl.
*B60G 17/018* (2006.01)
*G06F 18/2113* (2023.01)
*G06V 20/20* (2022.01)

(52) U.S. Cl.
CPC ...... *B60G 17/0182* (2013.01); *G06F 18/2113* (2023.01); *G06V 20/20* (2022.01); *B60G 2400/61* (2013.01); *B60G 2600/1871* (2013.01)

(58) Field of Classification Search
CPC ........... B60G 17/0182; B60G 2400/61; B60G 2600/1871; B60G 2400/106;
(Continued)

(56) References Cited

U.S. PATENT DOCUMENTS 7,181,323 B1 * 2/2007 Boka .................. G01S 7/4004
73/1.16
10,126,160 B2 11/2018 Brierly
(Continued)

FOREIGN PATENT DOCUMENTS

CN 106840097 * 6/2017 ............. G01C 9/00
CN 106849801 * 6/2017 ............. H02P 21/18
(Continued)

OTHER PUBLICATIONS

Lindsay Kleeman, Understanding and Applying Kalman Filtering, Department of Electrical and Computer Systems Engineering, Monash University, Clayton, 2017, https://www.cs.cmu.edu/~motionplanning/papers/sbp_papers/kalman/kleeman_understanding_kalman.pdf.*
(Continued)

*Primary Examiner* — Alexander Satanovsky
(74) *Attorney, Agent, or Firm* — Casimir Jones, S.C.; Robert A. Goetz

(57) ABSTRACT

Realized is a technique for estimating a state quantity of a vehicle, which technique is applicable to estimation of a vehicle weight and allows an increase in accuracy and speed of the estimation. A state quantity estimating device includes a data storing section (101), a predictive quantity computing section (102), an obtaining section (107), a Kalman gain computing section (103), an estimated quantity computing section (104) which calculates an estimated state quantity and estimated covariance, and a process noise covariance correcting section (106) which corrects process noise covariance. The estimated state quantity, the estimated covariance, and the process noise covariance, each of which has been calculated or corrected, are written in the data storing section (101) as a state quantity, state covariance, and process noise covariance, respectively, and are used in a next computation for estimating a state quantity.

18 Claims, 6 Drawing Sheets

(58) Field of Classification Search
CPC .......... B60G 2400/204; B60G 2400/30; B60G 2400/302; B60G 2400/32; B60G 2400/62; B60G 2400/952; B60G 2500/10; B60G 2600/70; B60G 2800/702; G06F 18/2113; G06F 2218/00; G06V 20/20; G01G 19/086
See application file for complete search history.

(56) References Cited

U.S. PATENT DOCUMENTS

| | | | | |
|---|---|---|---|---|
| 2005/0248485 | A1* | 11/2005 | Hatch | G01S 19/43 342/357.26 |
| 2011/0218764 | A1* | 9/2011 | Fujita | G01G 19/086 702/175 |
| 2019/0186985 | A1* | 6/2019 | Huang | G01G 19/03 |
| 2020/0025828 | A1* | 1/2020 | Sayegh | G01R 31/3842 |

FOREIGN PATENT DOCUMENTS

| | | | | |
|---|---|---|---|---|
| CN | 108128308 | * | 6/2018 | ......... B60W 40/112 |
| EP | 3019379 | | 4/2018 | |
| JP | 2000-74727 | | 3/2000 | |
| JP | 4229141 | | 2/2009 | |
| JP | 4583028 | | 11/2010 | |
| JP | 4926258 | | 5/2012 | |
| JP | 5164645 | | 3/2013 | |
| JP | 5200998 | | 6/2013 | |
| JP | 2013-152170 | | 8/2013 | |
| JP | 5668701 | | 2/2015 | |
| JP | 5692044 | | 4/2015 | |
| JP | 6248559 | | 12/2017 | |

OTHER PUBLICATIONS

Notice of Allowance for JP2018-197025, mailed Aug. 6, 2019.
Office Action for JP2018-197025, mailed Jun. 4, 2019.
International Preliminary Report on Patentability for PCT/JP2019/020084, mailed Apr. 29, 2021, 7 pages.
International Search Report for PCT/JP2019/020084, mailed Jun. 18, 2019, 1 page.

* cited by examiner

STATE QUANTITY ESTIMATION DEVICE, CONTROL DEVICE, AND STATE QUANTITY ESTIMATION METHOD

This application is a Continuation of PCT International Application No. PCT/JP2019/020084 filed in Japan on May 21, 2019, which claims the benefit of Patent Application No. 2018-197025 filed in Japan on Oct. 18, 2018, the entire contents of which are hereby incorporated by reference.

TECHNICAL FIELD

The present invention relates to a state quantity estimating device, a control device, and a state quantity estimating method.

BACKGROUND ART

In recent years, various controls have been carried out in vehicles, such as automobiles, so that, for example, safety and comfort of driving of the vehicles are increased. In order to appropriately carry out such control related to driving of a vehicle, it is required to accurately grasp mass (vehicle weight) of the vehicle in a moving state. As a technique for estimating a vehicle weight of a vehicle, the following technique is, for example, known. That is, (i) a state quantity, which depends on a vehicle, is obtained with use of various sensors, (ii) the state quantity is substituted into equations of motion, and (iii) noise is offset by subtracting two equations of motion from the equations of motion. Out of numerical values of the state quantity obtained with use of the various sensors, a numerical value which is not suitable for estimation of the state quantity is typically discarded in accordance with a threshold (see, for example, Patent Literature 1).

CITATION LIST

Patent Literature

Patent Literature 1

Japanese Patent Application Publication Tokukai No. 2013-152170 (Publication date: Aug. 8, 2013)

SUMMARY OF INVENTION

Technical Problem

According to the above technique, in a case where sensor values obtained by the various sensors include any numerical value which is not suitable for the estimation of the state quantity, the other suitable numerical values may be also discarded. Therefore, there may be fewer opportunities to estimate the state quantity of the vehicle, and thus it may be necessary to estimate the state quantity with fewer opportunities. This consequently causes accuracy of the estimation of the state quantity to be insufficient, and also causes stabilization of the estimation of the state quantity to take time. As such, the above technique has room for studies, from the viewpoint of increasing accuracy and speed of estimation of a state quantity of a vehicle.

An object of an aspect of the present invention is to realize a technique for quickly estimating a state quantity of a vehicle with higher accuracy.

Solution to Problem

In order to attain the above object, a state quantity estimating device in accordance with an aspect of the present invention is a state quantity estimating device including: a data storing section in which a state quantity that acts on a vehicle, state covariance that is covariance of the state quantity, and process noise covariance that is covariance of computation noise are stored; a predictive quantity computing section which computes a predictive state quantity from the state quantity and which computes, from the state covariance and the process noise covariance, predictive covariance that is covariance of the predictive state quantity; an obtaining section which obtains a sensor value of the vehicle; a Kalman gain computing section which computes Kalman gain with use of the sensor value and the predictive covariance; an estimated quantity computing section which computes an estimated state quantity from the Kalman gain, the predictive state quantity, and the sensor value with use of the Kalman filter and which computes estimated covariance from the Kalman gain, the predictive covariance, and the sensor value with use of the Kalman filter; and a process noise covariance correcting section which corrects the process noise covariance with use of the estimated state quantity, the estimated state quantity being written as the state quantity in the data storing section, the estimated covariance being written as the state covariance in the data storing section, the process noise covariance which has been corrected being written as the process noise covariance in the data storing section.

Advantageous Effects of Invention

According to an aspect of the present invention, it is possible to realize a technique for quickly estimating a state quantity of a vehicle with higher accuracy.

DESCRIPTION OF EMBODIMENTS

Embodiment 1

Figure 1:
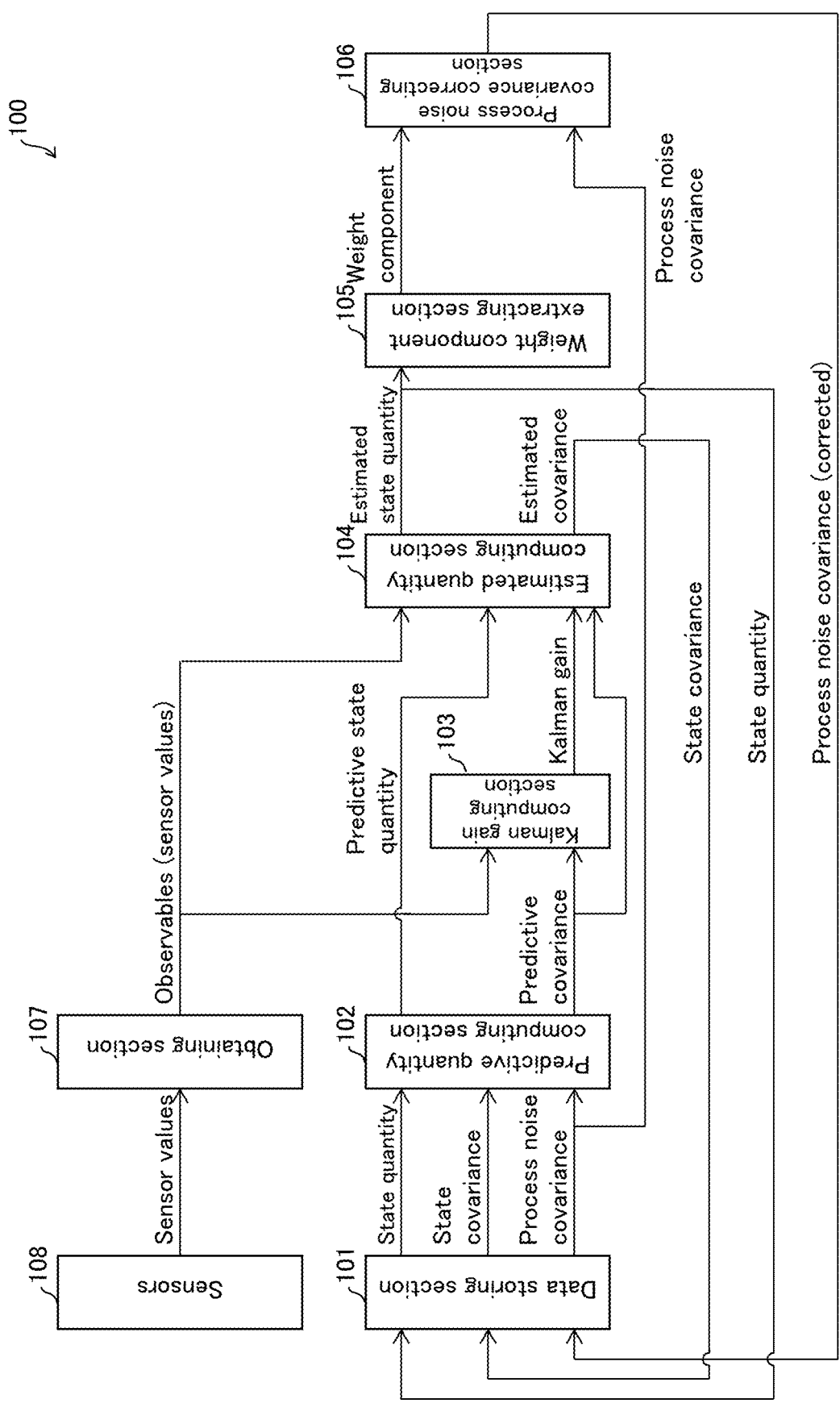
FIG. 1 is a block diagram illustrating an example of a functional configuration of a state quantity estimating device in accordance with Embodiment 1 of the present invention.

Embodiment 1 of the present invention will be described below in detail.

[Explanation of Logic of Estimation of State Quantity]

Momentum gained by a vehicle can be expressed by an equation of motion "F=ma". Here, "F" is a value obtained by subtracting various kinds of moving resistance from an engine output, "m" is a weight of the vehicle (vehicle weight), and "a" is acceleration of the vehicle. Since "a" can be determined by a value obtained by temporal differentiation of a vehicle speed V, "a" can be expressed by the following Equation 1. In Equation 1, $F_x$ represents an engine-derived output, $F_{air}$ represents an air resistance component, and $F_{surface}$ represents a road surface resistance component.

$$F_x - F_{air} - F_{surface} = m\frac{dV}{dt} \quad \text{(Equation 1)}$$

Here, $F_x$, which represents the engine-derived output, is determined by dividing wheel torque by a wheel radius. Further, $F_x$ is affected by gravitational acceleration based on a tilt of a road surface. Thus, $F_x$ can be expressed by the following Equation 2. In the following Equation 2, t represents the wheel torque, R represents the wheel radius, and Or represents the tilt angle of the road surface.

$$F_x = \frac{\tau}{R} - mg\sin\theta_r \quad \text{(Equation 2)}$$

As used herein, "wheel torque" is torque which is generated by a driving source of a vehicle in a moving state and which acts on wheels in a direction in which the vehicle is accelerated or decelerated. For example, according to a vehicle which has an internal combustion engine as a driving source, wheel torque is torque which is applied to wheels of the vehicle. The wheel torque caused by the internal combustion engine is calculated as follows. Torque generated by the internal combustion engine is estimated from an air-fuel ratio, an outside temperature, a degree of opening of a throttle valve, and the like. An estimated value thus obtained is multiplied by a coefficient of transmission loss, which is set for each vehicle, and a predetermined decelerating ratio, at which each decelerating mechanism causes deceleration. According to a vehicle which includes wheels each independently having, as driving sources, electric motors, wheel torque is total torque which is applied to the wheels of the vehicle. The wheel torque of the vehicle is calculated as follows. Torque is estimated from work efficiency of the electric motors and voltages applied to the electric motors. The torque thus estimated is multiplied by a coefficient of transmission loss, which is set for each vehicle, and a predetermined decelerating ratio, which at each decelerating mechanism causes deceleration. In a case where a vehicle further has differential control devices (LSDs) such as an electric differential gear, wheel torque may be calculated with further reference to operational statuses of these devices.

$F_{air}$, which represents the air resistance component, is determined by multiplying a coefficient of air resistance, which is specific to the vehicle, by the square of the vehicle speed. Thus, $F_{air}$ can be expressed by the following Equation 3. In the following Equation 3, Cd represents the coefficient of air resistance of the vehicle, and V represents the vehicle speed.

$$F_{air} = CdV^2 \quad \text{(Equation 3)}$$

$F_{surface}$, which represents the road surface resistance component, is a gravitational acceleration component, at an angle of the road surface, of a value which is obtained by multiplying a friction coefficient of the road surface by the vehicle weight. Thus, $F_{surface}$ can be expressed by the following Equation 4. In the following Equation 4, μ represents a coefficient of road surface resistance of the vehicle, m represents the vehicle weight, and Or represents the tilt angle of the road surface.

$$E_{surface} = \mu mg\cos\theta_r \quad \text{(Equation 4)}$$

Therefore, the equation of motion F=ma, which expresses the momentum gained by the vehicle, is expressed by the following Equations 5 and 6 on the basis of Equations 1 through 4.

$$\frac{\tau}{R} - mg\sin\theta_r - CdV^2 - \mu mg\cos\theta_r = m\frac{dV}{dt} \quad \text{(Equation 5)}$$

$$\frac{1}{m}\left(\frac{\tau}{R} - CdV^2\right) - g\sin\theta_r - \mu g\cos\theta_r = \frac{dV}{dt} \quad \text{(Equation 6)}$$

In a case where a moving state of the vehicle is controlled, a longitudinal G sensor which detects longitudinal G of the vehicle is generally used. A value $G_{sens}$ of the longitudinal G sensor indicates a gravitational acceleration component of the total of (i) a value which is obtained by the temporal differentiation of the vehicle speed and which is based on a pitch angle of a vehicle body, (ii) the angle of the road surface, and (iii) the pitch angle of the vehicle body. Therefore, the value $G_{sens}$ can be expressed by the following Equations 7 and 8. In the following Equations 7 and 8, 0p represents a pitch angle of the vehicle, and $\theta_p$ represents the tilt angle of the road surface.

$$G_{sens} = \frac{dV}{dt}\cos\theta_p - g\sin(\theta_r + \theta_p) \quad \text{(Equation 7)}$$

$$\frac{dV}{dt}\cos\theta_p = G_{sens} - g\sin(\theta_r + \theta_p) \quad \text{(Equation 8)}$$

Equation 9 is derived from Equations 6 and 8, and Equation 10 is derived from Equation 9.

$$\cos\theta_p\left\{\frac{1}{m}\left(\frac{\tau}{R} - CdV^2\right) - g\sin\theta_r - \mu g\cos\theta_r\right\} = \quad \text{(Equation 9)}$$
$$G_{sens} - g\sin(\theta_r + \theta_p)$$

$$\cos\theta_p\left(\frac{\tau}{R} - CdV^2 - mg\sin\theta_r - \mu mg\cos\theta_r\right) = \quad \text{(Equation 10)}$$
$$mG_{sens} - mg\sin\theta_r\cos\theta_p - mg\cos\theta_r\sin\theta_p$$

Here, in a case where approximation is carried out while it is assumed that $\theta_p$ is sufficiently low and $\theta_p$ is nearly equal to 0 (zero), the following Equation 11 is derived from Equation 10.

$$\frac{\tau}{R} - CdV^2 = mG_{sens} + mg\cos\theta_r(\mu - \sin\theta_p) \quad \text{(Equation 11)}$$

The following Equation 12 is derived by, in Equation 11, replacing the left side with Y, replacing $G_{sens}$ with G, and replacing $mg\cos\theta_r$ (μ-$\sin\theta_p$) with C.

$$Y = mG + C \quad \text{(Equation 12)}$$

For Y and G in Equation 12, the value of the sensor can be referred to, as has been described above. Further, "m" represents the vehicle weight, and is a constant because the vehicle weight is substantially constant during an appropriate time period during which a weight of a load on the vehicle does not substantially change. Further, according to Equation 11, C in Equation 12 is also a constant because "m" is a constant as described above and "g" represents gravitational acceleration. The pitch angle $\sin\theta_p$ of the vehicle body is nearly equal to 0 (zero) as described above, and is therefore regarded as a constant (0 (zero)). Thus, in Embodiment 1, since a change in the angle $\cos\theta_r$ of the road surface and a change in the coefficient of the road surface resistance u can be each handled as noise of the Kalman filter (later described), the angle $\cos\theta_r$ of the road surface and the coefficient of the road surface resistance μ are each treated as a constant here. Therefore, C is considered to be a constant in Equation 12.

The following Equation 13 is a prediction function of the Kalman filter. In Equation 13, "t" represents the number of computations, $Xa_{t-1}$ represents a state quantity which acts on the vehicle and which has been estimated in a previous computation, and $xb_t$ represents a predictive quantity of a state (predictive state quantity) which acts on the vehicle and which has been obtained in a current computation. The state quantity which acts on the vehicle is a physical quantity of the vehicle. Examples of the state quantity include the weight of the vehicle (vehicle weight) and a slope component of a road.

$$xb_t = f(x\alpha_{t-1}, 0, 0) \quad \text{(Equation 13)}$$

Equation 14 expresses, in matrices, xb on the basis of Equation 13. Since "m" and C are each a constant as described above, Equation 13 is considered not to change on the basis of the following Equation 14. Therefore, the state quantity $Xa_{t-1}$, which has been estimated in the previous computation, and the predictive state quantity $xb_t$, which has been obtained in the current computation, are identical to each other, and the following Equation 15 holds.

$$\begin{bmatrix} xb_{t,1} \\ xb_{t,2} \end{bmatrix} \equiv \begin{bmatrix} m_t \\ C_t \end{bmatrix} = \begin{bmatrix} m_{t-1} \\ C_{t-1} \end{bmatrix} \equiv \begin{bmatrix} f_1 \\ f_2 \end{bmatrix} \quad \text{(Equation 14)}$$

$$xb_t = xa_{t-1} \quad \text{(Equation 15)}$$

Further, covariance (predictive covariance) $P^-_t$ of the predictive state quantity $xb_t$ is expressed by the following Equation 16. In Equation 16, $P_{t-1}$ represents covariance which has been estimated in the previous computation (state covariance), and $Q_{t-1}$ represents process noise covariance which has been estimated in the previous computation. The state covariance is, for example, covariance which takes, as two variables, (i) the state quantity which acts on the vehicle and (ii) the process noise covariance. The process noise covariance is, for example, covariance which takes, as two variables, (i) noise in estimation of the vehicle weight m and (ii) noise in estimation of C such as the tilt of the road surface.

$$P^-_t = P_{t-1} + Q_{t-1} \quad \text{(Equation 16)}$$

Here, as an observation equation of the Kalman filter, Equation 12 is caused to correspond to the following Equation 17. In Equation 17, $h_t$ corresponds to Y, mb corresponds to "m", and Cb corresponds to C.

$$h_t = mb_t G_t + Cb_t \quad \text{(Equation 17)}$$

The left side of Equation 11 can be observed by the sensor, as has been described above, and is Y in Equation 12. In a case where the left side of Equation 11 is regarded as sensor values (also referred to as "observables") z, the following Equation 18 is derived.

$$\left(\frac{\tau}{R} - CdV^2\right)_t = Y_t = z_t \quad \text{(Equation 18)}$$

Kalman gain is determined in accordance with the following Equations 19 and 20. The Kalman gain is gain of the Kalman filter and is gain in which an observation error is corrected (or "optimized").

$$K_t = P^-_t H_t^T (H_t P^-_t H_t^T + R_t)^{-1} \quad \text{(Equation 19)}$$

$$H_{t[i,j]} = \left.\frac{\partial h_{t[i]}}{\partial x_{[j]}}\right|_{(xb_t, 0)} = [G_t \ 1] \quad \text{(Equation 20)}$$

A Kalman filter computation is carried out in accordance with the following Equation 21 to obtain an estimated state quantity $xa_t$. Further, a Kalman filter computation is carried out in accordance with the following Equation 22 to obtain estimated covariance $P_t$.

$$Xa_t = xb_t + K_t(z_t - (H_t \times b_t)) \quad \text{(Equation 21)}$$

$$P_t = (I - K_t H_t) P^-_t \quad \text{(Equation 22)}$$

Example of Functional Configuration

FIG. 1 is a block diagram illustrating an example of a functional configuration of a state quantity estimating device in accordance with Embodiment 1. As illustrated in FIG. 1, a state quantity estimating device 100 includes a data storing section 101, a predictive quantity computing section 102, a Kalman gain computing section an 103, estimated quantity computing section 104, a weight component extracting section 105, a process noise covariance correcting section 106, an obtaining section 107, and sensors 108.

The data storing section 101 stores therein data on a state quantity (xα), state covariance (P), and process noise covariance (Q).

The predictive quantity computing section 102 computes a predictive state quantity (xb) from the state quantity xα. The predictive quantity computing section 102 further computes predictive covariance (P⁻) from the state covariance P and the process noise covariance Q.

The obtaining section 107 obtains sensor values (z) of a vehicle. The obtaining section 107 obtains the sensor values z from the sensors 108 provided to the vehicle. The sensors 108 includes, for example, various sensors which are used to detect a physical quantity indicative of a state of the vehicle, and a device which calculates the physical quantity from values that have been detected by the various sensors.

The Kalman gain computing section 103 computes Kalman gain (K) with use of the sensor values z and the predictive covariance P⁻.

The estimated quantity computing section 104 computes an estimated state quantity xa from the Kalman gain K, the predictive state quantity xb, and the sensor values z with use of the Kalman filter. The estimated state quantity xa indicates an estimated value of a state quantity which estimated from the predictive state quantity xb. Further, the estimated quantity computing section 104 computes estimated covariance P from the Kalman gain K, the predictive covariance P⁻, and the sensor values z with use of the Kalman filter.

The weight component extracting section 105 extracts a weight component (m) of the vehicle from the estimated state quantity xa.

The process noise covariance correcting section 106 corrects the process noise covariance Q with use of the weight component which has been extracted by the weight component extracting section 105.

The estimated quantity computing section 104 stores, in the data storing section 101, the estimated state quantity xa which is based on the state quantity xα, as a state quantity xa which is to be used in a next computation. The estimated quantity computing section 104 stores, in the data storing section 101, the estimated covariance P which is based on the state quantity xa, as state covariance P which is to be used in the next computation. Further, the process noise covariance correcting section 106 corrects the process noise covariance Q with use of the weight component m which has been extracted from the estimated state quantity, and stores, in the data storing section 101, the process noise covariance Q as process noise covariance Q which is to be used in the next computation. In this manner, the state quantity estimating device 100 is configured such that (i) the estimated state quantity xa which has been computed in a current computation is written in the data storing section 101 as a state quantity which is to be used in a next computation and (ii) the estimated covariance P which has been computed in the current computation is written in the data storing section 101 as state covariance P which is to be used in the next computation.

Note that the state quantity estimating device 100 does not need to include the weight component extracting section 105. In this case, the process noise covariance correcting section 106 may obtain, not the weight component m, but the estimated state quantity xα, which is data prior to extraction of the weight component m, from the estimated quantity computing section 104. Then, the process noise covariance correcting section 106 may correct the process noise covariance Q with use of the estimated state quantity xα. According to the present invention, a mode of correcting process noise covariance includes various modes. A process of estimating a state quantity will be described below. Note that the various modes of correcting process noise covariance will be particularly described later.

Example of Process

Figure 2:
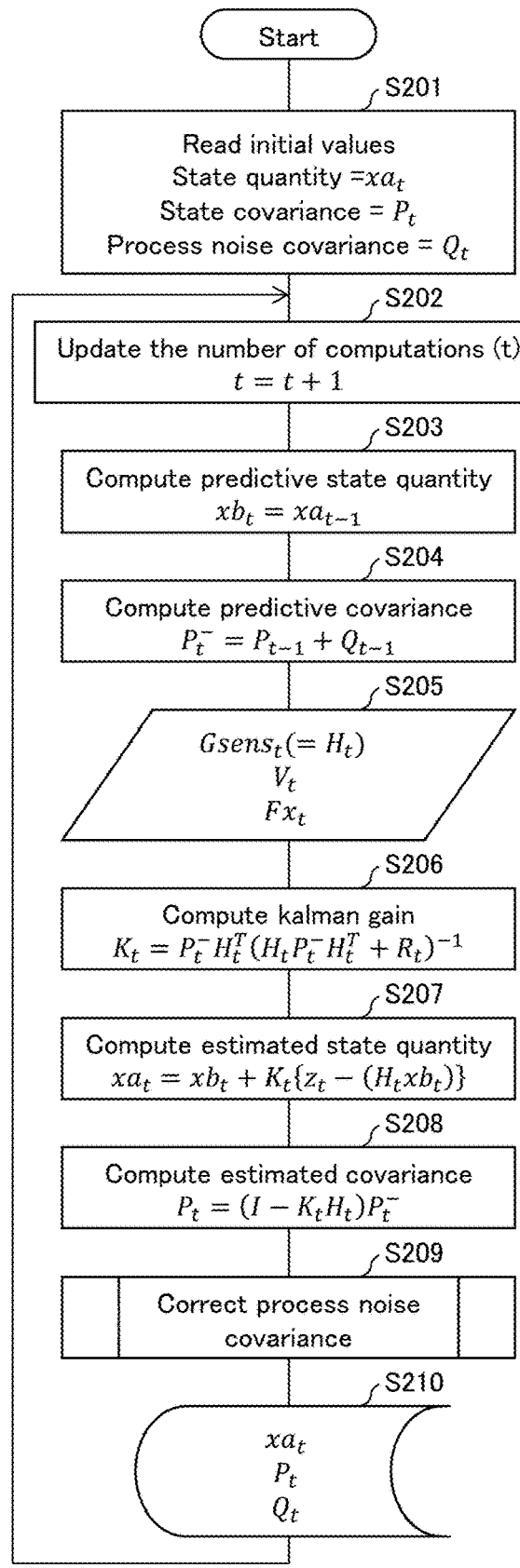
FIG. 2 is a flowchart illustrating an example of a flow of a process of estimating a state quantity in accordance with Embodiment 1.

FIG. 2 is a flowchart illustrating an example of a flow of a process of estimating a state quantity in accordance with Embodiment 1.

The data storing section 101 stores therein a state quantity $Xa_t$, state covariance $P_t$, and process noise covariance $Q_t$ (step S201). Note that "t" represents the number of computations and an initial value of "t" is 0 (zero).

In a step S202, the state quantity estimating device 100 updates the number of computations t by incrementing the number of computations t by one. For example, in a case where a current computation is the t-th computation, an immediately previous computation is represented by t−1, a computation before the immediately previous computation is represented by t−2, and a next computation is represented by t+1.

The predictive quantity computing section 102 then computes a predictive state quantity from the state quantity which has an initial value or which has been obtained in a previous computation. The predictive quantity computing section 102 further computes predictive covariance, which is covariance of the predictive state quantity, from (i) the state covariance which has an initial value or which has been obtained in the previous computation and (ii) the process noise covariance which has an initial value or which has been obtained in the previous computation. For example, the predictive quantity computing section 102 consecutively computes the predictive state quantity and the predictive covariance at predetermined intervals.

That is, in a step S203, the predictive quantity computing section 102 computes a predictive state quantity xb in accordance with Equation 13. The predictive quantity computing section 102 sets, as a predictive state quantity $xb_t$ to be determined, the state quantity $xa_{t-1}$ which has been obtained in the previous computation.

In a step S204, the predictive quantity computing section 102 computes predictive covariance $P^-$ in accordance with Equation 16. The predictive quantity computing section 102 determines predictive covariance P'+ from the sum of the state covariance $P_{t-1}$ and the process noise covariance $Q_{t-1}$ each of which has been obtained in the previous computation.

Meanwhile, the obtaining section 107 obtains, from the sensors 108, various sensor values (also referred to as "observables z"), in accordance with which a state of a vehicle is detected. For example, the obtaining section 107 consecutively obtains the sensor values at predetermined intervals. Each of the observables z may be a sensor value itself of a sensor or may be alternatively a value of a physical quantity of the vehicle in a moving state, the physical quantity depending on the vehicle and having been calculated from the sensor value. For example, in a step S205, the obtaining section 107 obtains (i) $G_{senst}$ which is a sensor value of a longitudinal G sensor, (ii) vehicle speed $V_t$, and (iii) a value of an engine-derived output $F_{xt}$ of the vehicle. Note, here, that $G_{senst}$ is $H_t$ in Equation 20.

In a step S206, the Kalman gain computing section 103 computes Kalman gain $K_t$ in accordance with Equation 19 with use of the observables $Z_t$ and the predictive covariance $P_t$. For example, the Kalman gain computing section 103 consecutively computes the Kalman gain K at predetermined intervals.

In a step S207, the estimated quantity computing section 104 computes an estimated state quantity $xa_t$ in accordance with Equation 21 from the Kalman gain $K_t$, the predictive state quantity $xb_t$, and the observables $Z_t$ ($H_t$) with use of the Kalman filter.

In a step S208, the estimated quantity computing section 104 computes estimated covariance $P_t$ in accordance with Equation 22 from the Kalman gain $K_t$, the predictive covariance P-t, and the observables $Z_t$ ($H_t$) with use of the Kalman filter. For example, the estimated quantity computing section 104 consecutively computes the estimated state quantity and the estimated covariance at predetermined intervals.

In a step S209, the process noise covariance correcting section 106 corrects the process noise covariance $Q_{t-1}$ with use of the estimated state quantity $Xa_t$. For example, the process noise covariance correcting section 106 consecutively corrects the process noise covariance $Q_t$ at predetermined intervals. Such corrected process noise covariance is regarded as "$Q_t$". Various modes of correcting process noise covariance will be described below.

Figure 3:
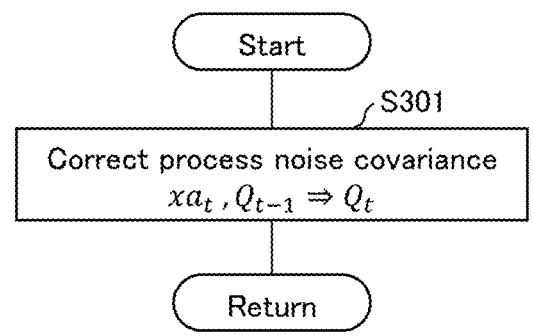
FIG. 3 is a flowchart illustrating a flow of a first mode of a process of correcting process noise covariance in Embodiment 1.

FIG. 3 is a flowchart illustrating a flow of a first mode of a process of correcting process noise covariance in Embodiment 1. In step S301, the process noise covariance correcting section 106 computes corrected process noise covariance $Q_t$ by correcting process noise covariance $Q_{t-1}$ on the basis of the process noise covariance $Q_{t-1}$ and an estimated state quantity xa_t which has been determined by the estimated quantity computing section 104.

Typically, the cycle of computation for estimating a state quantity which acts on a vehicle is sufficiently short, as compared with a time period in which the state quantity changes over time. Thus, typically, a state quantity xa can be sometimes considered constant. In such a case, in a case where the estimated state quantity $xa_t$ which has been obtained in a current computation is different from a state quantity $Xa_{t-1}$ which has been obtained in a previous computation, it is considered that such a difference has been caused by noise. It is possible to correct the process noise covariance $Q_{t-1}$ as appropriate by (i) creating, in advance, a map in which a state quantity xa and process noise covariance Q are associated with each other and which corresponds to the vehicle and (ii) referring to the map.

Note that, in the first mode, the state quantity estimating device 100 does not need to include the weight component extracting section 105. A state quantity which acts on a vehicle includes a vehicle weight. However, even in a case where the state quantity estimating device 100 does not include the weight component extracting section 105, it is possible to appropriately and quickly estimate the state quantity, including the vehicle weight, by using the Kalman filter and correcting process noise covariance.

Figure 4:
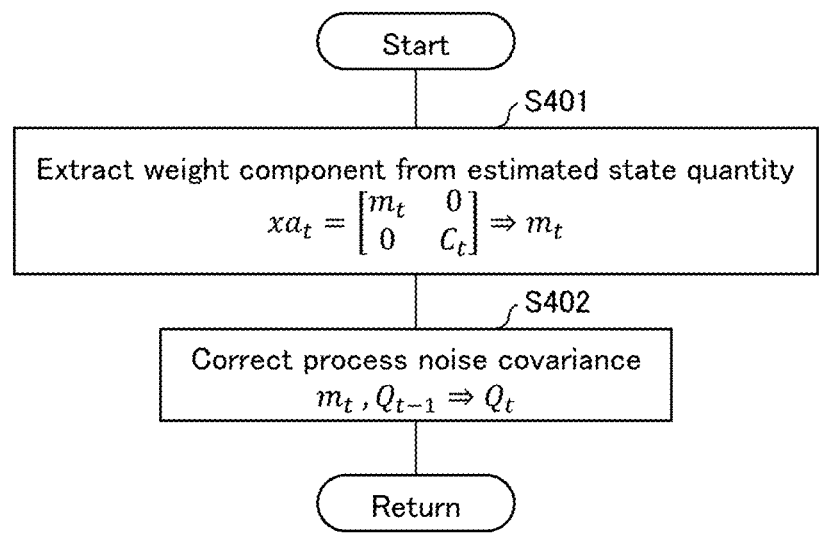
FIG. 4 is a flowchart illustrating a flow of a second mode of the process of correcting process noise covariance in Embodiment 1.

FIG. 4 is a flowchart illustrating a flow of a second mode of the process of correcting process noise covariance in Embodiment 1. In the second mode, the state quantity estimating device 100 includes the weight component extracting section 105. In the second mode, the process noise covariance correcting section 106 corrects process noise covariance Q with use of a weight component m which has been extracted by the weight component extracting section 105.

In a step S401, the weight component extracting section 105 consecutively extracts a weight component $m_t$ of a vehicle from an estimated state quantity $xa_t$, for example, at predetermined intervals. An estimated state quantity xa is expressed by a matrix of a weight component m of a vehicle and a constant C in Equation 12. The weight component m can be determined as a value expressed in the matrix.

In a step S402, the process noise covariance correcting section 106 computes corrected process noise covariance $Q_t$ by correcting process noise covariance $Q_{t-1}$-on the basis of the process noise covariance $Q_{t-1}$ and the weight component $m_t$ which has been extracted by the weight component extracting section 105. The corrected process noise covariance $Q_t$ is determined, for example, by referring to a map, which has been created in advance and corresponds to a vehicle as has been described above and in which a weight component m and process noise covariance Q are associated with each other, for the weight component $m_t$ and the process noise covariance $Q_{t-1}$. According to the above correcting process, it is possible to further prevent unnecessary variation of process noise covariance from affecting estimation of a weight component of a vehicle.

Figure 5:
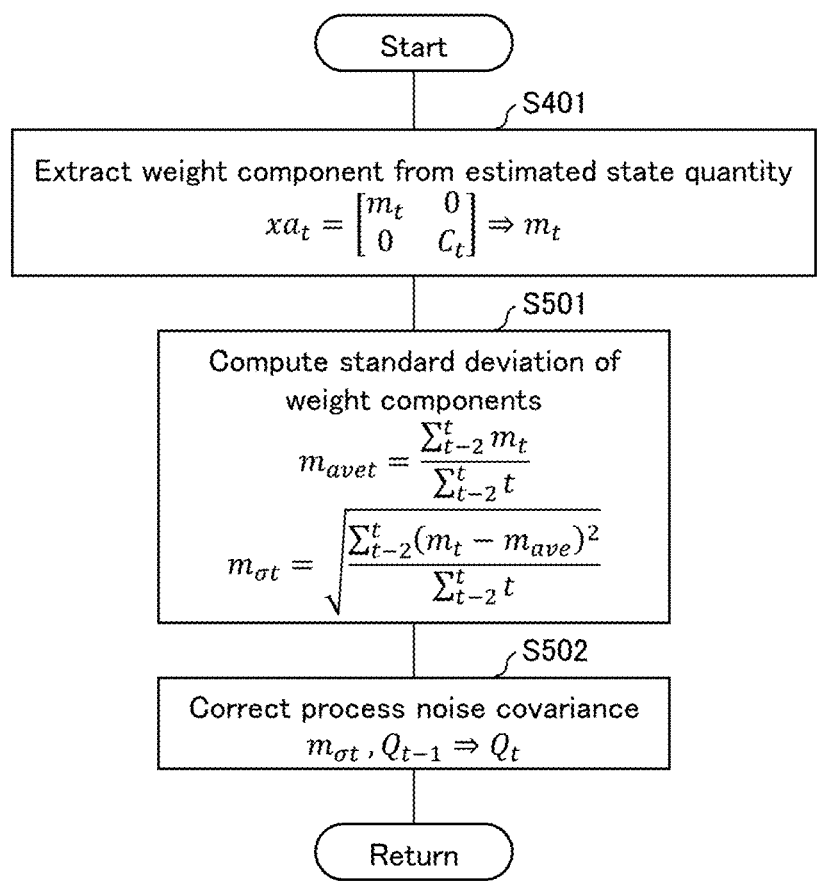
FIG. 5 is a flowchart illustrating a flow of a third mode of the process of correcting process noise covariance in Embodiment 1.

FIG. 5 is a flowchart illustrating a flow of a third mode of the process of correcting process noise covariance in Embodiment 1. In the third mode, the weight component extracting section 105 computes an average $m_{ave}$ and a standard deviation $m_o$ of a weight component m. The process noise covariance correcting section 106 then corrects process noise covariance Q with use of the standard deviation $m_o$ which has been computed by the weight component extracting section 105.

In a step S401, the weight component extracting section 105 extracts a weight component $m_t$. In a step S501, the weight component extracting section 105 computes an average $m_{ave_t}$ and a standard deviation mot of the weight component $m_t$ which has been extracted in a predetermined range of computations (for example, with use of the weight component $m_t$, a weight component $m_{t-1}$ which has been obtained in an immediately previous computation, and a weight component $m_{t-2}$ which has been obtained in a computation before the immediately previous computation).

In a step S502, the process noise covariance correcting section 106 computes corrected process noise covariance $Q_t$ by correcting process noise covariance $Q_{t-1}$ on the basis of the standard deviation mot and the process noise covariance $Q_{t-1}$. In this case, the corrected process noise covariance $Q_t$ is determined, for example, as follows.

Process noise covariance Q is expressed by a 2×2 matrix as shown by the following Equation 23. In the following Equation 23, $Q_1$ represents variance of noise in estimation of a vehicle weight m, and $Q_2$ represents variance of noise in estimation of another state quantity C such as a slope of a road surface. It is possible to correct the process noise covariance Q by changing, as appropriate, one or both of $Q_1$ and $Q_2$, depending on the standard deviation $m_o$.

$$Q = \begin{bmatrix} Q_1 & 0 \\ 0 & Q_2 \end{bmatrix} \quad \text{(Equation 23)}$$

More specifically, it can be said that, in a case where the standard deviation mot of the weight component $m_t$ of an estimated state quantity $xa_t$ is small, variance $Q_1$ of noise in the estimation of "m" is also small. Thus, by making a correction so that $Q_1$ becomes smaller or by making a correction so that $Q_2$ becomes larger and, accordingly, $Q_1$ relatively becomes smaller, it is possible to correct the process noise covariance Q as appropriate.

It can be said that, in a case where the standard deviation mot of the weight component $m_t$ of the estimated state quantity $xa_t$ is large, the variance $Q_1$ of the noise in the estimation of "m" is also large. Thus, by making a correction so that $Q_1$ becomes larger or by making a correction so that $Q_2$ becomes smaller and, accordingly, $Q_1$ relatively becomes larger, it is possible to correct the process noise covariance Q as appropriate.

It is possible to determine, in accordance with a plurality of thresholds, whether the standard deviation ma is large or small, and possible to correct, in accordance with the plurality of thresholds, $Q_1$ or $Q_2$ stepwise as described above. For example, by reading, from a map, $Q_1$ or $Q_2$ which corresponds to $m_o$, it is possible to determine a suitable value of $Q_1$ or $Q_2$ which suitable value varies depending on $m_o$, and possible to correct $Q_1$ or $Q_2$ as described above on the basis of the suitable value. According to such a correcting method, since process noise covariance Q is corrected in accordance with behavior of a weight component m so far, it is possible to more stably estimate a state quantity.

Figure 6:
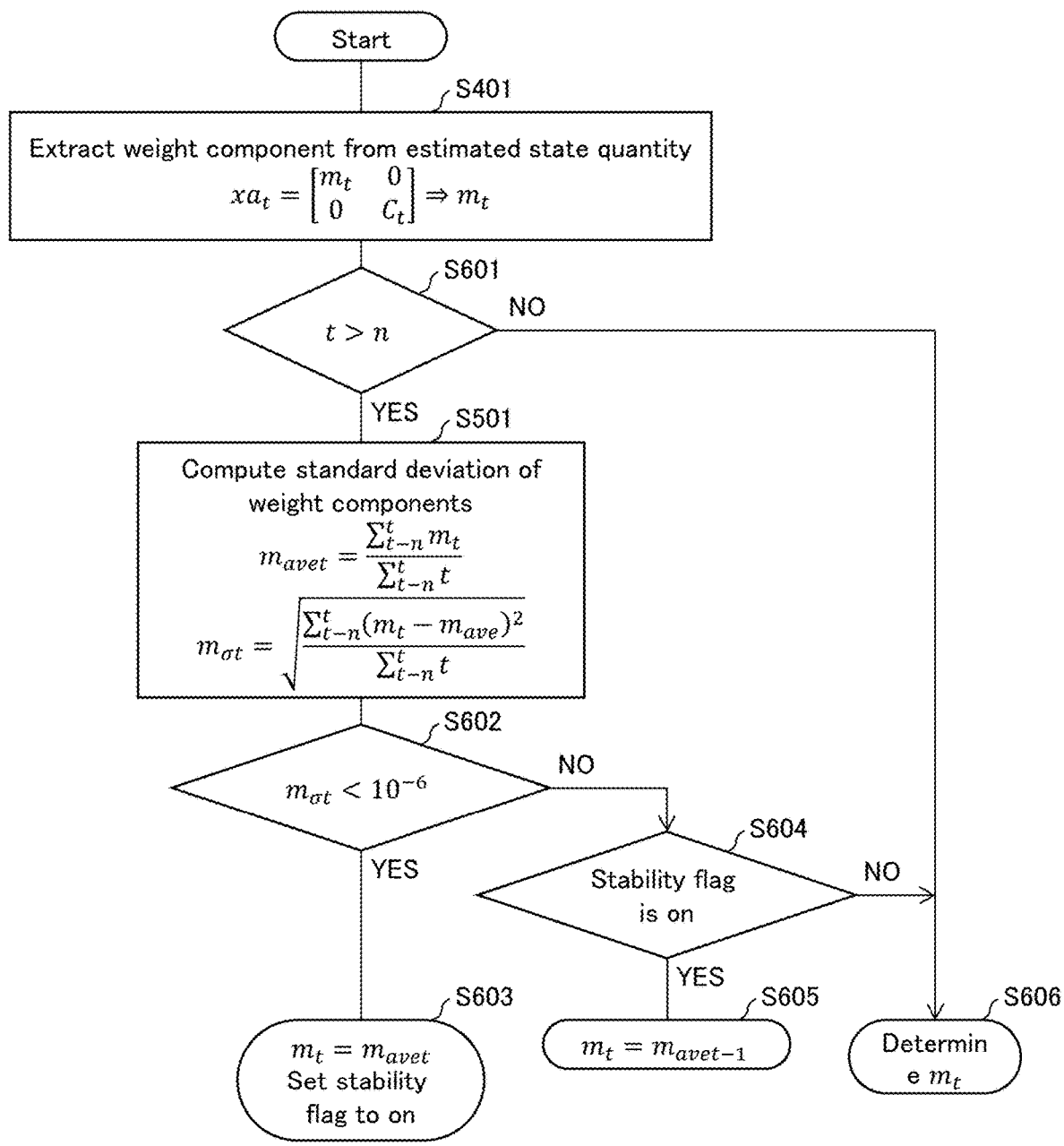
FIG. 6 is a flowchart illustrating a flow of a fourth mode of the process of correcting process noise covariance in Embodiment 1.

FIG. 6 is a flowchart illustrating a flow of a fourth mode of the process of correcting process noise covariance in Embodiment 1. Note that, in the fourth mode, the weight component extracting section 105 includes a stability flag and a weight determining section. The stability flag in a process of estimating a state quantity is initially set to OFF. In a case where the stability flag is ON, 1 (one) is inputted in the stability flag. In a case where the stability flag is OFF, 0 (zero) is inputted in the stability flag. The weight determining section determines a weight component m in accordance with information indicative of one or more selected from the group consisting of the number of computations t of an estimated state quantity xa, a value of a standard deviation $m_o$, and ON/OFF of the stability flag.

In a step S401, the weight component extracting section 105 extracts a weight component $m_t$ from an estimated state quantity $xa_t$.

In a step S601, the weight determining section determines whether or not the number of computations t exceeds a predetermined number (n). In a case where it is determined, in the step S601, that the number of computations t exceeds the predetermined number (n), the weight component extracting section 105 computes an average $m_{avet}$ and a standard deviation mot of a weight component $m_t$ in a step S501.

In a step S602, the weight determining section determines whether or not the standard deviation mot is lower than a predetermined threshold of 10-6.

In a case where it is determined, in the step S602, that the standard deviation mot is lower than the threshold, the weight determining section determines, in a step S603, the average $m_{avet}$ of the weight component as an extracted weight component $m_t$. The weight determining section then sets the stability flag to ON.

In a case where it is determined, in the step S602, that the standard deviation mot is not lower than the threshold, the weight determining section determines, in a step S604, whether or not the stability flag is ON.

In a case where it is determined, in the step S604, that the stability flag is ON, the weight determining section determines, in a step S605, a weight component $m_t$ which was determined in an immediately previous computation or any of computations before the immediately previous computation in which the stability flag was set to ON (for example, a weight component $m_{t-1}$ determined in the immediately previous computation), as a weight component $m_t$ which has been extracted in a current computation.

In a case where it is determined, in the step S604, that the stability flag is OFF, the weight determining section determines, in a step S606, the most recently extracted weight component $m_t$ as a weight component as it is. In a case where it is determined, in the step S601, that the number of computations t is equal to or lower than the predetermined number (n), the weight determining section proceeds to the step S606 and determines the most recently extracted weight component $m_t$ as a weight component as it is.

Note that, in a case where the weight component $m_t$ is determined in the step S603, the process noise covariance correcting section 106 may correct, in a step S502, process noise covariance $Q_{t-1}$ on the basis of the standard deviation mot of the weight component which standard deviation mot has been determined in the step S501.

In a case where the weight component extracting section 105 determines the weight component $m_t$ from the standard deviation in the S603 or determines the weight component $m_t$ in the step S606, the process noise covariance correcting section 106 computes, in a step S402, corrected process noise covariance $Q_t$ by correcting process noise covariance $Q_{t-1}$ with use of the weight component. According to the flow illustrated in FIG. 6, a result obtained in a current computation, an immediately previous computation, or any of computations before the immediately previous computation is used, as appropriate, depending on circumstances. Therefore, such estimation of a state quantity is suitable from the viewpoint of quickly estimating a state quantity of a vehicle with sufficiently high accuracy.

Then, in a step S210 as shown in the flow illustrated in FIG. 2, the estimated quantity computing section 104 stores the estimated state quantity $xa_t$ and estimated covariance $P_t$ in the data storing section 101, and the process noise covariance correcting section 106 stores the corrected process noise covariance $Q_t$ in the data storing section 101. As such, the estimated state quantity $xa_t$ is written, in the data storing section 101, as a state quantity $xa_t$ obtained in the t-th computation, the estimated covariance $P_t$ is written, in the data storing section 101, as state covariance $P_t$ obtained in the t-th computation, and the corrected process noise covariance $Q_t$ is written, in the data storing section 101, as process noise covariance $Q_t$ obtained in the t-th computation. In this manner, a state quantity, state covariance, and process noise covariance are consecutively written in the data storing section 101, for example, at predetermined intervals. These pieces of data written in the data storing section 101 are used as has been described above in a new computation, as results obtained in a previous computation, so as to estimate a new state quantity, when the number of computations is updated.

A series of processes as has been described above may be ended, in a case where a vehicle is brought into a state in which a state quantity to be estimated can be changed. According to the processes, the state quantity includes a weight component. Therefore, it is possible to end the processes in a case where the vehicle is brought into a state in which a vehicle weight of the vehicle can be changed. Examples of a case where the vehicle weight of the vehicle can be changed include: a case where the vehicle is stopped; a case where a door of the vehicle is opened or closed; and a case where a fuel inlet of the vehicle is opened or closed.

The state quantity estimating device in accordance with Embodiment 1 uses the Kalman filter to estimate a state quantity including a vehicle weight. Therefore, there is no need to discard an observable, depending on a condition under which estimation is carried out, and it is possible to use substantially all of obtained observables in a computation so as to estimate the state quantity. It is therefore possible to quickly and sufficiently obtain an estimated value of the state quantity of a vehicle.

Furthermore, according to the state quantity estimating device in accordance with Embodiment 1, process noise covariance is corrected. For example, in a case where a vehicle weight of a vehicle is estimated in accordance with various sensor values, the vehicle weight of the vehicle may change depending on a moving state of the vehicle. However, in a case where the vehicle weight is estimated every predetermined time period (for example, from when the vehicle starts to move to when the vehicle stops), the vehicle weight is substantially constant. According to Embodiment 1, by correcting the process noise covariance, it is possible to substantially ignore a parameter which changes the vehicle weight, depending on the moving state of the vehicle. This makes it possible to stably estimate a state quantity of the vehicle. It is therefore possible to quickly estimate the state quantity of the vehicle with sufficiently high accuracy.

According to the state quantity estimating device in accordance with Embodiment 1, a state quantity including a vehicle weight is estimated. The state quantity estimating device is applicable to a control device which is used for a vehicle and which uses an estimated value of a vehicle weight. In such a case, the state quantity estimating device may further include an output section which outputs, to an external member, the state quantity including a weight component.

The output section can be selected as appropriate, provided that the output section can output, to the external member, the state quantity including the vehicle weight. In a case where the output section outputs the vehicle weight, it is preferable that the output section be a weight component extracting section which extracts a weight component m. In this manner, in a case where the state quantity estimating device is applied to a control device for controlling a vehicle on the basis of a vehicle weight, the weight component extracting section 105 may output an extracted weight component $m_t$ as a current weight of the vehicle. This is preferable from the viewpoint of using a result of estimation of the vehicle weight to control a moving state of the vehicle.

As has been described, according to the state quantity estimating device in accordance with Embodiment 1, it is possible to use sensor values to estimate a state quantity of a vehicle without discarding any of the sensor values, and possible to stably estimate the state quantity by correcting process noise covariance. Therefore, an estimated value of the state quantity has moderate robustness, and converges on an appropriate value in a short time period after the vehicle starts to move. By controlling a moving state of the vehicle with use of the estimated value, it is possible to more suitably control the moving state of the vehicle.

The following description will discuss a mode in which the state quantity estimating device in accordance with Embodiment 1 is applied to a control device for a suspension device in a vehicle.

Embodiment 2

Another embodiment of the present invention will be described below. Note that, for convenience, members having functions identical to those of members described in Embodiment 1 are denoted by identical reference numerals, and description thereof will not be repeated.

The vehicle includes a processor, sensors, and a storage medium, in addition to various pieces of equipment which cause the vehicle to move. The processors includes a predictive quantity computing section, an obtaining section, a Kalman gain computing section, an estimated quantity computing section, and a process noise covariance correcting section as have been described above. The sensors include a longitudinal G sensor, an axle torque sensor, and a vehicle speed sensor as have been described above. The storage medium corresponds to a data storing section as has been described above, and is, for example, a magnetic disc.

Figure 7:
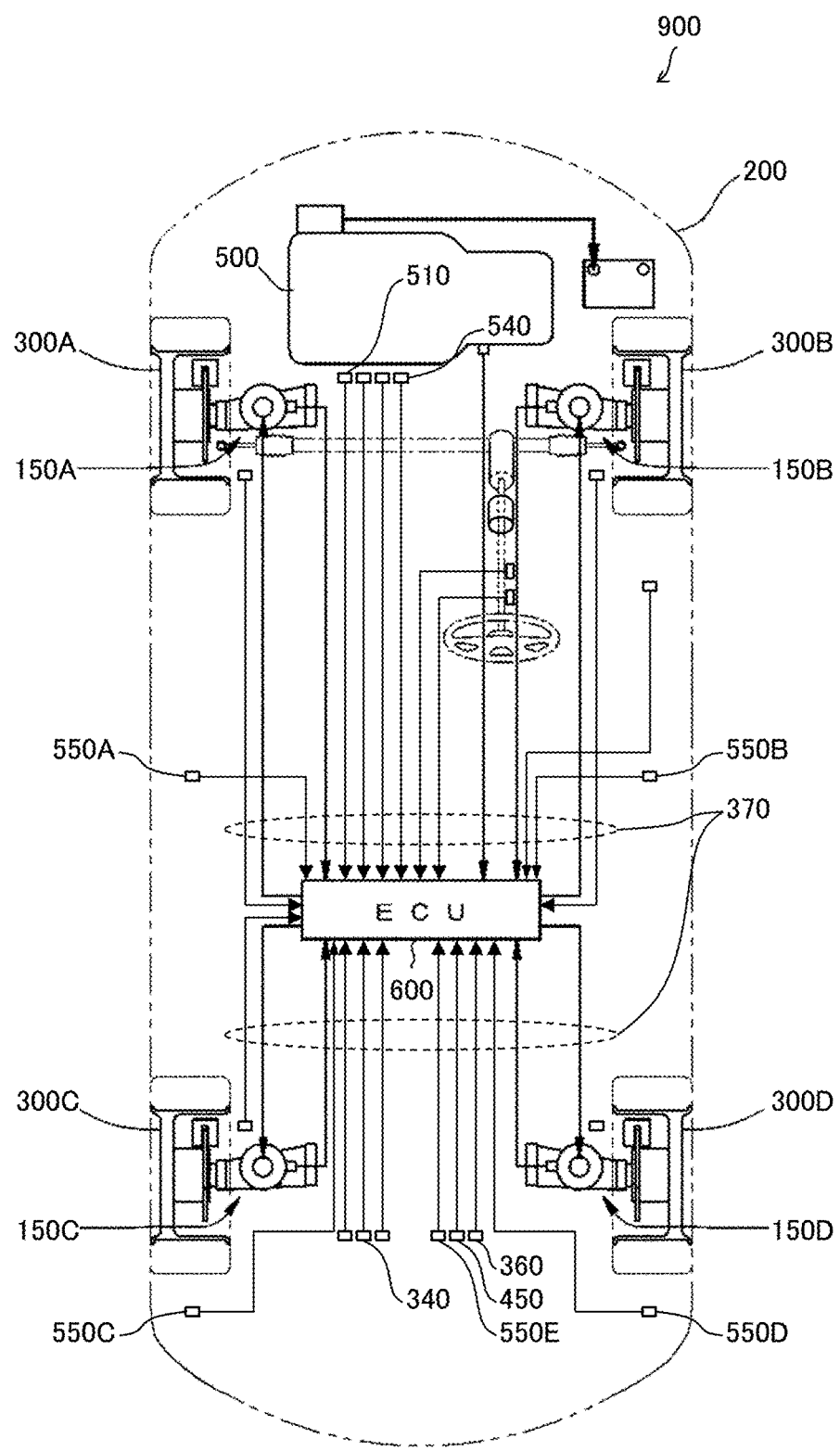
FIG. 7 is a drawing schematically illustrating an example of a configuration of a vehicle to which the state quantity estimating device in accordance with Embodiment 1 is applied.

FIG. 7 is a drawing schematically illustrating an example of a configuration of a vehicle having a state quantity estimating device as has been described above. As illustrated in FIG. 7, a vehicle 900 includes suspension devices (suspensions) 150, a vehicle body 200, wheels 300, a vehicle speed sensor 450 which detects a vehicle speed (V), an engine 500, and an electronic control unit (ECU) 600. The ECU600 corresponds to the foregoing processor.

Note that alphabets "A" to "E" in reference numerals indicate respective positions in the vehicle 900. The alphabet "A" represents a left-front position in the vehicle 900. The alphabet "B" represents a right-front position in the vehicle 900. The alphabet "C" represents a left-rear position in the vehicle 900. The alphabet "D" represents a right-rear position in the vehicle 900. The alphabet "E" represents a rear position in the vehicle 900.

The vehicle 900 further includes a longitudinal G sensor 340 which detects acceleration in a longitudinal direction of the vehicle 900 (hereinafter, the acceleration will be also referred to as "longitudinal G") (the longitudinal G sensor 340 obtains the above-described "$G_{sens}$") and a wheel torque sensor 510 which estimates torque (wheel torque (t)) generated by the engine 500. The wheel torque is torque applied to the wheels of the vehicle 900 as has been described above, and corresponds to a driving force of the vehicle 900.

The vehicle 900 further includes a fuel sensor 360 which detects an amount of fuel (gasoline) contained in a fuel tank (not illustrated), door opening and closing 550 which detect opening and closing of sensors respective doors of the vehicle 900, and a gear position sensor 540 which detects a position to which a gear of the vehicle 900 is connected. Note that a door opening and closing sensor 550E detects opening and closing of a door of a baggage compartment (rear door) of the vehicle 900.

Via a controller area network (CAN) 370, outputs of such various sensors are supplied to the ECU 600, and a control signal is transmitted from the ECU 600 to each section. Each of the sensors may be newly provided to the vehicle 900 for estimation of a state quantity (later described). However, it is preferable that each of the sensors be a sensor existing in the vehicle 900, from the viewpoint of costs.

In a storage medium, various pieces of information necessary to estimate the state quantity are stored. Examples of such information include a wheel radius, a Cd value (coefficient of air resistance), and initial values of the state quantity, state covariance, a state standard deviation, and covariance of processing noise. Each of the initial values is a numerical value which has been determined in advance by a test and so on and which is appropriate as an initial value.

In a case where, for example, a vehicle weight is estimated as the state quantity of the vehicle 900, an initial value of the vehicle weight may be a provisional total weight of the vehicle 900. The provisional total weight may be, for example, the sum of a dry weight of the vehicle 900 and the total weight or expected total weight of a load on the vehicle. Alternatively, the provisional total weight may be, for example, a value obtained by adding, to the dry weight of the vehicle 900, an amount of remaining gasoline detected by the fuel sensor 360. Alternatively, the provisional total weight may be, for example, the sum of (i) the dry weight of the vehicle 900, (ii) a value obtained by multiplying, by a weight corresponding to one person, the number of floor doors each of which has been detected as being opened by a corresponding one of the door opening and closing sensors 550, and (iii) a predetermined weight in a case where opening and closing of the rear door has been detected by a corresponding one of the door opening and closing sensors 550. Alternatively, the provisional total weight may be a value obtained by further referring to whether or not a seat belt in the vehicle 900 is worn. By referring to whether or not the seat belt is worn, the number of persons who ride in the vehicle 900 is grasped with higher accuracy. Grasping the number of persons who ride in the vehicle 900 with high accuracy is effective in, for example, setting a lower limit value of the weight of the vehicle 900, and is preferable from the viewpoint of further enhancing reliability of the provisional total weight.

Estimation of the state quantity of the vehicle 900 is carried out as has been described in Embodiment 1. A process of estimating the state quantity of the vehicle 900 is basically consecutively carried out at predetermined intervals. In a case where an estimated value of the state quantity is stable, the estimation of the state quantity may be carried out intermittently at longer intervals. The state quantity estimated by the ECU 600 is used for, for example, control in another device which is included in the vehicle 900 and which requires the estimated value of the state quantity. The another device may receive such an estimated state quantity from an estimated quantity computing section or may alternatively read the estimated state quantity from a data storing section.

For example, generally, a vehicle weight is determined by a weight of a vehicle and a total weight of a load on the vehicle. Typically, the weight of the load on the vehicle does not substantially vary while the vehicle is moving. Thus, it is possible to consider the vehicle weight substantially constant from when the vehicle starts to move to when the vehicle stops. In Embodiment 2, the state quantity including a weight component of the vehicle is estimated by the state quantity estimating device as has been described above. Therefore, when the vehicle starts to move, an estimated value of the vehicle weight is quickly obtained based on observables. The vehicle weight is substantially constant until movement of the vehicle is interrupted so that the vehicle weight can change (stopping of the vehicle due to arrival at an intersection or a destination, opening and closing of a door or a fuel cap at a time of stopping, and so on). Therefore, it is possible to regard, as noise of the process, an observable and a result of a computation each of which results in a change in estimated value of the vehicle weight while the vehicle is moving. Therefore, according to an ECU in accordance with Embodiment 2, the vehicle weight of the vehicle in a moving state is quickly and easily estimated. It is therefore possible to stably estimate the vehicle weight.

In Embodiment 2, a result of the estimation may be discarded in a case where a value which is not appropriate as the vehicle weight of the vehicle in the moving state is calculated as the estimated value of the vehicle weight, for example, in a case where the vehicle weight is equal to or less than a weight at a time when the vehicle is empty (empty weight). Note that, as has been described above, the estimation of the vehicle weight of the vehicle is typically carried out consecutively. However, in a case where a sufficiently reliable value has been already obtained, the estimated value of the vehicle weight may be discarded or the estimation of the vehicle weight may be alternatively carried out intermittently.

In the foregoing embodiment, the computing section which computes various values or a correcting section, which are included in the state quantity estimating device, writes a calculated value in the data storing section. According to an embodiment of the present invention, the ECU may further include a writing section for writing, in a data written section, data on these values.

The estimation of the state quantity, which estimation is carried out by the state quantity estimating device, can be reset, in accordance with a state of the vehicle in which state the state quantity is likely to change. For example, it is assumed that the vehicle weight of the vehicle is estimated. In such a case, when a position of a key of the vehicle is set to an OFF position or when a door is opened, an initial value of the estimated state quantity may be reset and the estimation of the state quantity may be newly started.

In the above embodiment of the present invention, a four-wheeled vehicle has been explained as an example. However, the vehicle to which the present invention is applied is not limited to such a four-wheeled vehicle. For example, the vehicle may be a motorcycle or a railroad vehicle.

According to Embodiment 2, as has been described above, it is possible to obtain a stable estimated value of a vehicle weight in a short time after a vehicle starts to move. Therefore, in a case where a moving state of the vehicle is controlled based on an estimated value of the vehicle weight, it is possible to more stably and suitably carry out control.

Embodiment 3

According Embodiment 3, an ECU further includes a weight component extracting section as has been described above. In the other points, Embodiment 3 is similar to Embodiment 2 described above.

According to Embodiment 3, a weight component of a vehicle is extracted by the weight component extracting section. According to Embodiment 3, it is possible to more accurately and more quickly carry out control in which an estimated value of a vehicle weight of the vehicle is used. Another device which is included in the vehicle and which requires the estimated value of the vehicle weight may receive, as the estimated value of the vehicle weight, the weight component determined by the weight component extracting section. The weight component extracting section may further write the weight component determined in a data storing section as an estimated vehicle weight. Writing of the weight component in the data storing section may be carried out via a writing section.

Embodiment 4

A vehicle weight estimated by a state quantity estimating device in accordance with Embodiment 4 can be used to control suspension devices 150. A control device which controls the suspension devices 150 included in a vehicle 900 is configured to estimate a state quantity which acts on the vehicle 900 and control a damping force of each of the suspension devices 150 in accordance with the state quantity. Embodiment 4 can be implemented by a publicly known method of controlling the damping force of each of the suspension devices 150 in accordance with an estimated value of the vehicle weight, except that the state quantity or the estimated value of the vehicle weight which has been obtained by the state quantity estimating device in accordance with Embodiment 4 is used.

Each of the suspension devices 150 has, for example, (i) an absorber interposed between a vehicle body of the vehicle and a corresponding one of wheels of the vehicle and (ii) a spring arranged so as to expand and contract in response to a stroke of the absorber. The absorber has a cylinder, a piston which is slidable and which divides an inside of the cylinder into two chambers, a piston rod which is fixed to the piston, a communicating passage via which the two chambers are communicated, and a solenoid valve which can open and close the communicating passage. Each of the two chambers, into which the inside of the cylinder is divided by the piston, is filled with a hydraulic fluid. The spring is arranged so as to surround an outer periphery of the piston rod, and is supported by an end of the cylinder and an end of the piston rod. An ECU 600 causes a degree of opening of the solenoid valve to be adjusted so that, as an estimated quantity of the vehicle weight becomes greater, the damping force of each of the suspension devices 150 becomes greater.

Note that each of the suspension devices 150 is not limited to any particular structure. For example, a position of the solenoid in each of the suspension devices 150 is not limited to any particular position. Each of the suspension devices 150 may be of, for example, a piston-in type or an outer tube connected type. Further, each of the suspension devices 150 is not limited to any particular type, and may be, for example, of a strut type or a double wishbone type. In this manner, it is possible to employ suspension devices having various structures or of various types as the suspension devices 150. Furthermore, a method of adjusting the damping force of each of the suspension devices 150 is not limited to any particular method. As described above, a method of adjusting the damping force of the absorber may be employed. Alternatively, a method of varying a spring rate of the spring (automatically variable preload) may be employed. Alternatively, both of these methods may be employed.

According Embodiment 4, when a vehicle starts to move, a stable estimated value of a state quantity of the vehicle is quickly obtained. By controlling a suspension device with use of such an early and stably obtained estimated value of the state quantity including a vehicle weight, it is possible to more suitably control the suspension device in accordance with a moving state of the vehicle.

Software Implementation Example

Control blocks of the state quantity estimating device (particularly, the predictive quantity computing section 102, the Kalman gain computing section 103, the estimated quantity computing section 104, the weight component extracting section 105, and the process noise covariance correcting section 106) can be realized by a logic circuit (hardware) provided in an integrated circuit (IC chip) or the like or can be alternatively realized by software.

In the latter case, a state quantity estimating device includes a computer that executes instructions of a program that is software realizing the foregoing functions. The computer, for example, includes at least one processor and a computer-readable storage medium which stores the program therein. An object of the present invention can be achieved by the processor of the computer reading and executing the program stored in the storage medium. Examples of the processor include a central processing unit (CPU). Examples of the storage medium include a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

Aspects of the present invention can also be expressed as follows:

As is clear from the above description, a state quantity estimating device (ECU 600) in accordance with an embodiment of the present invention includes: a data storing section (101) in which a state quantity that acts on a vehicle (900), state covariance that is covariance of the state quantity, and process noise covariance that is covariance of computation noise are stored; a predictive quantity computing section (102) which computes a predictive state quantity from the state quantity and which computes, from the state covariance and the process noise covariance, predictive covariance that is covariance of the predictive state quantity; an obtaining section (107) which obtains a sensor value of the vehicle (900); a Kalman gain computing section (103) which Kalman gain with use of the sensor value and the predictive covariance; an estimated quantity computing section (104) which computes an estimated state quantity from the Kalman gain, the predictive state quantity, and the sensor value with use of the Kalman filter and which computes estimated covariance from the Kalman gain, the predictive covariance, and the sensor value with use of the Kalman filter; and a process noise covariance correcting section (106) which corrects the process noise covariance with use of the estimated state quantity. The estimated state quantity is written as the state quantity in the data storing section (101), the estimated covariance is written as the state covariance in the data storing section (101), and the process noise covariance which has been corrected is written as the process noise covariance in the data storing section (101). According to the above configuration, a computation is carried out with use of the Kalman filter. Therefore, even in a case where observables include an observable which does not meet a condition, it is not necessary to discard such an observable. Thus, it is possible to use the observables, which have been obtained from sensors, for the computation. Moreover, process noise covariance is corrected. Therefore, it is possible to stably, accurately, and quickly estimate a state quantity of a vehicle in variously differing estimation environments The state quantity estimating device may be arranged so as to further include a weight component extracting section (105) which extracts a weight component of the vehicle from the estimated state quantity. According to such a configuration, it is possible to more precisely estimate a vehicle weight.

Further, the state quantity estimating device may be arranged such that the weight component extracting section (105) computes an average and a standard deviation of weight components of the vehicle. Such a configuration is more effective, from the viewpoint of simply estimating a vehicle weight with sufficient accuracy.

Further, the state quantity estimating device may be arranged such that the weight component extracting section (105) includes: a stability flag which is initially set to OFF; and a weight determining section which determines the weight component in accordance with information indicative of one or more selected from the group consisting of the number of computations of the estimated state quantity, a value of the standard deviation, and ON/OFF of the stability flag. The weight determining section may determine, as the weight component which has been extracted, the weight component which has been most recently extracted, in a case where the number of computations of the estimated state quantity is equal to or lower than a predetermined number, determine the average as the weight component which has been extracted and sets the stability flag to ON, in a case where the number of computations of the estimated state quantity exceeds the predetermined number and the standard deviation is lower than a predetermined threshold, determine, as the weight component which has been extracted, the weight component which was extracted in an immediately previous computation or any of computations before the immediately previous computation in which the stability flag was set to ON, in a case where (i) the stability flag is ON, (ii) the number of computations of the estimated state quantity exceeds the predetermined number, and (iii) the standard deviation is equal to or higher than the predetermined threshold, and determine, as the weight component which has been extracted, the weight component which has been most recently extracted, in a case where (i) the number of computations of the estimated state quantity exceeds the predetermined number, (ii) the standard deviation is equal to or higher than the predetermined threshold, and (iii) the stability flag is OFF. Such a configuration is much more effective, from the viewpoint of simply and quickly estimating a vehicle weight with sufficient accuracy.

Further, the state quantity estimating device may be arranged such that the process noise covariance correcting section (106) corrects the process noise covariance with use of the weight component which has been extracted by the weight component extracting section (105). Such a configuration is more effective, from the viewpoint of simply estimating a vehicle weight with sufficient accuracy.

Further, the state quantity estimating device may be arranged such that the process noise covariance correcting section (106) corrects the process noise covariance with use of the standard deviation which has been computed by the weight component extracting section (105). Such a configuration is much more effective, from the viewpoint of simply estimating a vehicle weight with sufficient accuracy.

Further, the state quantity estimating device may be arranged such that the weight component extracting section (105) outputs, as a current weight of the vehicle (900), the weight component which has been extracted. Such a configuration is preferable from the viewpoint of using a result of estimation of a vehicle weight to control a moving state of the vehicle.

A control device in accordance with an embodiment of the present invention is a control device which estimates a state quantity that acts on a vehicle (900) having a suspension device (105) and which controls a damping force of the suspension device (150) in accordance with the state quantity. The control device includes: a data storing section (101) in which the state quantity that acts on the vehicle, state covariance that is covariance of the state quantity, and process noise covariance that is covariance of computation noise are stored; a predictive quantity computing section (102) which computes a predictive state quantity from the state quantity and which computes, from the state covariance and the process noise covariance, predictive covariance that covariance of the predictive state quantity; an obtaining section (107) which obtains a sensor value of the vehicle; a Kalman gain computing section (103) which computes Kalman gain with use of the sensor value and the predictive covariance; an estimated quantity computing section (104) which computes an estimated state quantity from the Kalman gain, the predictive state quantity, and the sensor value with use of the Kalman filter and which computes estimated covariance from the Kalman gain, the predictive covariance, and the sensor value with use of the Kalman filter; and a process noise covariance correcting section (106) which corrects the process noise covariance with use of the estimated state quantity, the estimated state quantity being written as the state quantity in the data storing section (101), the estimated covariance being written as the state covariance in the data storing section (101), the process noise covariance which has been corrected being written as the process noise covariance in the data storing section (101). According to such a configuration, it is possible to quickly estimate a state quantity, including a vehicle weight, with sufficient accuracy. It is therefore possible to control a suspension device of a vehicle so that more comfortable movement of the vehicle is realized.

A method of estimating a state quantity in accordance with an embodiment of the present invention includes the steps of: storing, in a data storing section, a state quantity that acts on a vehicle (900), state covariance that is covariance of the state quantity, and process noise covariance that is covariance of computation noise; computing a predictive state quantity from the state quantity and computing, from the state covariance and the process noise covariance, predictive covariance that is covariance of the predictive state quantity; obtaining a sensor value of the vehicle (900); computing Kalman gain with use of the sensor value and the predictive covariance; computing an estimated state quantity from the Kalman gain, the predictive state quantity, and the sensor value with use of the Kalman filter; computing estimated covariance from the Kalman gain, the predictive covariance, and the sensor value with use of the Kalman filter; correcting the process noise covariance with use of the estimated state quantity; and writing, in the data storing section, the estimated state quantity as the state quantity, the estimated covariance as the state covariance, the process noise covariance which has been corrected as the process noise covariance. According to such a configuration, as has been described, it is possible to use observables obtained from sensors for a computation. Moreover, it is possible to prevent, from substantially affecting estimation of a state quantity to be obtained, a variation in process noise covariance which is substantially not related to the state quantity. It is therefore possible to quickly and accurately estimate a state quantity of a vehicle.

The present invention is not limited to the embodiments, but can be altered by a skilled person in the art within the scope of the claims. For example, the present invention also encompasses, in its technical scope, any embodiment derived by combining any of the embodiments with a known technical means which is easily considered an alternative, such as the Unscented Kalman filter.

REFERENCE SIGNS LIST

100 State quantity estimating device
101 Data storing section
102 Predictive quantity computing section
103 Kalman gain computing section
104 Estimated quantity computing section
105 Weight component extracting section
106 Process noise covariance correcting section
107 Obtaining section
108 Sensors
150 Suspension device
200 Vehicle body
300 Wheel
340 Longitudinal G sensor
360 Fuel sensor
450 Vehicle speed sensor
500 Engine
510 Wheel torque sensor
540 Gear position sensor
550 Door opening and closing sensor
600 ECU (vehicle weight estimating device)
900 Vehicle

We claim:

1. ECU (Electronic Control Unit) for vehicle which estimates a state quantity which acts on a device of a vehicle which is for controls to more stably and suitably moving state of the vehicle comprising:

a data storing section in which a state quantity that acts on a vehicle and that includes at least a vehicle weight, state covariance that is covariance of the state quantity, and process noise covariance that is covariance of computation noise are stored;

a predictive quantity computing section which computes a predictive state quantity from the state quantity and which computes, from the state covariance and the process noise covariance, predictive covariance that is covariance of the predictive state quantity;

an obtaining section which obtains sensor values from a vehicle speed sensor detecting vehicle speed, a longitudinal G sensor detecting acceleration in a longitudinal direction of the vehicle, and a wheel torque sensor estimating torque generated be an engine and applied to wheels of the vehicle, the sensor values being received via a controller area network (CAN);

a Kalman gain computing section which computes Kalman gain with use of the sensor values and the predictive covariance;

an estimated quantity computing section which computes an estimated state quantity from the Kalman gain, the predictive state quantity, and the sensor values with use of the Kalman filter and which computes estimated covariance from the Kalman gain, the predictive covariance, and the sensor values with use of the Kalman filter;

a weight component extracting section which extracts a weight component of the vehicle from the estimated state quantity; and a process noise covariance correcting section which corrects the process noise covariance by: using the weight component which has been extracted by the weight component extracting section; and correcting a process noise covariance which was used to estimate a state quantity by referring to a correlation between a state quantity of the vehicle and a process noise covariance, the estimated state quantity being written as the state quantity in the data storing section, the estimated covariance being written as the state covariance in the data storing section, the process noise covariance which has been corrected being written as the process noise covariance in the data storing section, wherein the ECU uses at least the weight component as the state quantity for controlling suspension devices installed at a left-front position, a right-front position a left-rear, and a right-rear position of the vehicle to adjust damping forces of the suspension devices, resulting in improved vehicle stability during acceleration, braking, and cornering, wherein the weight component extracting section outputs, as a current weight of the vehicle, the weight component which has been extracted, wherein the weight component extracting section computes an average and a standard deviation of weight components of the vehicle, and wherein:
the state quantity further includes a slope component of a road surface on which the vehicle moves;
the process noise covariance includes at least vehicle weight noise in estimation of the vehicle weight and slope component noise in estimation of the slope component; and
the process noise covariance correcting section corrects the process noise covariance so that the vehicle weight noise is directly or indirectly proportional to the standard deviation of the vehicle weight.

2. The ECU for vehicle as set forth in claim 1, wherein the weight component extracting section includes a weight determining section which determines the weight component in accordance with information indicative of one or more selected from the group consisting of the number of computations of the estimated state quantity and a value of the standard deviation.

3. The ECU for vehicle as set forth in claim 2, wherein the process noise covariance correcting section corrects the process noise covariance with use of the standard deviation which has been computed by the weight component extracting section.

4. The ECU for vehicle as set forth in claim 2, wherein the weight component extracting section outputs, as a current weight of the vehicle, the weight component which has been extracted.

5. The ECU for vehicle as set forth in claim 2, wherein:
the weight component extracting section further includes a stability flag which is initially set to OFF;
the group from which the one or more are selected in the weight determining section further includes ON/OFF of the stability flag; and
the weight determining section
determines, as the weight component which has been extracted, the weight component which has been most recently extracted, in a case where the number of computations of the estimated state quantity is equal to or lower than a predetermined number,
determines the average as the weight component which has been extracted, and sets the stability flag to ON, in a case where the number of computations of the estimated state quantity exceeds the predetermined number and the standard deviation is lower than a predetermined threshold,
determines, as the weight component which has been extracted, the weight component which was extracted in an immediately previous computation or any of computations before the immediately previous computation in which the stability flag was set to ON, in a case where (i) the stability flag is ON, (ii) the number of computations of the estimated state quantity exceeds the predetermined number, and (iii) the standard deviation is equal to or higher than the predetermined threshold, and
determines, as the weight component which has been extracted, the weight component which has been most recently extracted, in a case where (i) the number of computations of the estimated state quantity exceeds the predetermined number, (ii) the standard deviation is equal to or higher than the predetermined threshold, and (iii) the stability flag is OFF.

6. The ECU for vehicle as set forth in claim 5, wherein the process noise covariance correcting section corrects the process noise covariance with use of the standard deviation which has been computed by the weight component extracting section.

7. The ECU for vehicle as set forth in claim 5, wherein the weight component extracting section outputs, as a current weight of the vehicle, the weight component which has been extracted.

8. The ECU for vehicle as set forth in claim 1, wherein the process noise covariance correcting section corrects the process noise covariance with use of the standard deviation which has been computed by the weight component extracting section.

9. The ECU for vehicle as set forth in claim 1, wherein the vehicle has a suspension device as the any devices, and, the control device uses at least the weight component as the state quantity and controls a damping force of the suspension.

10. The ECU for vehicle as set forth in claim 1, wherein the weight component extracting section outputs, as a current weight of the vehicle, the weight component which has been extracted.

11. The ECU for vehicle as set forth in claim 1, wherein the weight component extracting section includes a weight determining section which determines the weight component in accordance with information indicative of one or more selected from the group consisting of the number of computations of the estimated state quantity and a value of the standard deviation.

12. The ECU for vehicle as set forth in claim 11, wherein:
the weight component extracting section further includes a stability flag which is initially set to OFF;
the group from which the one or more are selected in the weight determining section further includes ON/OFF of the stability flag; and
the weight determining section
determines, as the weight component which has been extracted, the weight component which has been most recently extracted, in a case where the number of computations of the estimated state quantity is equal to or lower than a predetermined number,
determines the average as the weight component which has been extracted and sets the stability flag to ON, in a case where the number of computations of the estimated state quantity exceeds the predetermined number and the standard deviation is lower than a predetermined threshold,
determines, as the weight component which has been extracted, the weight component which was extracted in an immediately previous computation or any of computations before the immediately previous computation in which the stability flag was set to ON, in a case where (i) the stability flag is ON, (ii) the number of computations of the estimated state quantity exceeds the predetermined number, and (iii) the standard deviation is equal to or higher than the predetermined threshold, and
determines, as the weight component which has been extracted, the weight component which has been most recently extracted, in a case where (i) the number of computations of the estimated state quantity exceeds the predetermined number, (ii) the standard deviation is equal to or higher than the predetermined threshold, and (iii) the stability flag is OFF.

13. The ECU for vehicle as set forth in claim 12, wherein the process noise covariance correcting section corrects the process noise covariance with use of the standard deviation which has been computed by the weight component extracting section.

14. The ECU for vehicle as set forth in claim 11, wherein the process noise covariance correcting section corrects the process noise covariance with use of the standard deviation which has been computed by the weight component extracting section.

15. The ECU for vehicle as set forth in claim 11, wherein the weight component extracting section outputs, as a current weight of the vehicle, the weight component which has been extracted.

16. The ECU for vehicle as set forth in claim 1, wherein the weight component extracting section outputs, as a current weight of the vehicle, the weight component which has been extracted.

17. A method of ECU (Electric Control Unit) of the vehicle which control any devices of a vehicle, which estimates a state quantity that acts on the vehicle and which controls the devices in accordance with the state quantity to moving state to more stably and suitable comprising the steps of:

storing, in a data storing section, a state quantity that acts on a vehicle and that includes at least a vehicle weight, state covariance that is covariance of the state quantity, and process noise covariance that is covariance of computation noise;

computing a predictive state quantity from the state quantity and computing, from the state covariance and the process noise covariance, predictive covariance that is covariance of the predictive state quantity;

obtaining sensor values from a vehicle speed sensor detecting vehicle speed, a longitudinal G sensor detecting acceleration in a longitudinal directing of the vehicle, and a wheel torque sensor estimating torque generated by an engine and applied to wheels of the vehicle, the sensor values being received via a controller area network (CAN);

computing Kalman gain with use of the sensor values and the predictive covariance;

computing an estimated state quantity from the Kalman gain, the predictive state quantity, and the sensor values with use of the Kalman filter;

computing estimated covariance from the Kalman gain, the predictive covariance, and the sensor values with use of the Kalman filter;

extracting a weight component of the vehicle from the estimated state quantity; and
correcting the process noise covariance by: using the weight component of the vehicle; and correcting a process noise covariance which was used to estimate a state quantity by referring to a correlation between a state quantity of the vehicle and a process noise covariance;

writing, in the data storing section, the estimated state quantity as the state quantity, the estimated covariance as the state covariance, the process noise covariance which has been corrected as the process noise covariance, wherein the method of ECU uses at least the weight component as the state quantity for controlling suspension devices installed at a left-front position, a right-front position, a left-rear position, and a right-rear position of the vehicle to adjust damping forces of the suspension devices, resulting in improved vehicle stability during acceleration, braking, and concerning, wherein, in the method of ECU, the weight component which has been extracted is output as a current weight of the vehicle, wherein the method of ECU computes an average and a standard deviation of weight components of the vehicle, wherein:
the state quantity further includes a slope component of a road surface on which the vehicle moves;
the process noise covariance includes at least vehicle weight noise in estimation of the vehicle weight and slope component noise in estimation of the slope component; and
the method of ECU corrects the process noise covariance so that the vehicle weight noise is directly or indirectly proportional to the standard deviation of the vehicle weight.

18. ECU (Electronic Control Unit) for vehicle which estimates a state quantity which acts on a device of a vehicle which is for controls to more stably and suitably moving state of the vehicle comprising:
a data storing section in which a state quantity that acts on a vehicle and that includes at least a vehicle weight, state covariance that is covariance of the state quantity, and process noise covariance that is covariance of computation noise are stored;

a predictive quantity computing section which computes a predictive state quantity from the state quantity and which computes, from the state covariance and the process noise covariance, predictive covariance that is covariance of the predictive state quantity;

an obtaining section which obtains sensor values from a vehicle speed sensor detecting vehicle speed, a longitudinal G sensor detecting acceleration in a longitudinal direction of the vehicle, and a wheel torque sensor estimating torque generated by an engine and applied to wheels of the vehicle, the sensor values being received via a controller area network (CAN);

a Kalman gain computing section which computes Kalman gain with use of the sensor values and the predictive covariance;

an estimated quantity computing section which computes an estimated state quantity from the Kalman gain, the predictive state quantity, and the sensor values with use of the Kalman filter and which computes estimated covariance from the Kalman gain, the predictive covariance, and the sensor values with use of the Kalman filter;

a weight component extracting section which extracts a weight component of the vehicle from the estimated state quantity; and a process noise covariance correcting section which corrects the process noise covariance by: using the weight component which has been extracted by the weight component extracting section; and correcting a process noise covariance which was used to estimate a state quantity by referring to a correlation between a state quantity of the vehicle and a process noise covariance, the estimated state quantity being written as the state quantity in the data storing section, the estimated covariance being written as the state covariance in the data storing section, the process noise covariance which has been corrected being written as the process noise covariance in the data storing section, wherein the ECU uses at least the weight component as the state quantity for controlling suspension devices installed at a left-front position, a right-front position, a left-rear position, and a right-rear position of the vehicle to adjust damping forces of the suspension devices, resulting in improved vehicle stability during acceleration, braking, and cornering, wherein the weight component extracting section computes an average and a standard deviation of weight components of the vehicle, wherein the weight component extracting section includes a weight determining section which determines the weight component in accordance with information indicative of one or more selected from the group consisting of the number of computations of the estimated state quantity and a value of the standard deviation, and wherein: the weight component extracting section further includes a stability flag which is initially set to OFF;

the group from which the one or more are selected in the weight determining section further includes ON/OFF of the stability flag; and the weight determining section determines, as the weight component which has been extracted, the weight component which has been most recently extracted, in a case where the number of computations of the estimated state quantity is equal to or lower than a predetermined number, determines the average as the weight component which has been extracted, and sets the stability flag to ON, in a case where the number of computations of the estimated state quantity exceeds the predetermined number and the standard deviation is lower than a predetermined threshold, determines, as the weight component which has been extracted, the weight component which was extracted in an immediately previous computation or any of computations before the immediately previous computation in which the stability flag was set to ON, in a case where (i) the stability flag is ON, (ii) the number of computations of the estimated state quantity exceeds the predetermined number, and (iii) the standard deviation is equal to or higher than the predetermined threshold, and determines, as the weight component which has been extracted, the weight component which has been most recently extracted, in a case where (i) the number of computations of the estimated state quantity exceeds the predetermined number, (ii) the standard deviation is equal to or higher than the predetermined threshold, and (iii) the stability flag is OFF.

* * * * *